United States Patent [19]

Guskin

[11] Patent Number: 4,787,012
[45] Date of Patent: Nov. 22, 1988

[54] METHOD AND APPARATUS FOR ILLUMINATING CAMERA SUBJECT

[75] Inventor: Joel C. Guskin, Fort Worth, Tex.

[73] Assignee: Tandy Corporation, Fort Worth, Tex.

[21] Appl. No.: 66,775

[22] Filed: Jun. 25, 1987

[51] Int. Cl.⁴ .............................................. G03B 15/06
[52] U.S. Cl. ...................................... 362/3; 354/126; 354/354
[58] Field of Search .................... 362/3; 354/126, 131, 354/354; 430/395; 313/110; 250/495.1

[56] References Cited

U.S. PATENT DOCUMENTS

| | | | |
|---|---|---|---|
| 2,983,823 | 5/1961 | Oberly | 250/495.1 |
| 3,637,300 | 1/1972 | Eacho | 354/354 |
| 3,752,983 | 8/1973 | Yanez | 354/126 |
| 3,812,506 | 5/1974 | Klebanow | 354/126 |
| 3,821,764 | 6/1974 | Shelton | 362/3 |
| 3,930,158 | 12/1975 | Chicklu et al. | 354/126 |
| 4,620,104 | 10/1986 | Nordaj et al. | 250/495.1 |

Primary Examiner—Raymond A. Nelli
Attorney, Agent, or Firm—Wolf, Greenfield & Sacks

[57] ABSTRACT

A method and apparatus for illuminating the suject being photographed by a camera by generating infrared light from an infrared light source and illuminating the subject with the infrared light. The source of infrared light is preferably mounted in or on the camera to shine on the face of a person being photographed.

10 Claims, 1 Drawing Sheet

METHOD AND APPARATUS FOR ILLUMINATING CAMERA SUBJECT

BACKGROUND OF THE INVENTION

1. Field of the Invention

This invention relates to a method and apparatus for illuminating the subject being photographed by a camera.

2. Background Discussion

In applications where the image being photographed by a camera is to be transmitted to a remote location, such as in picture telephones or in the cameras of security systems, charged coupled device (CCD) cameras are normally utilized. In such applications, ambient light, whether from the sun or from an artificial source such as an incandescent or fluorescent light fixture, is relied upon to illuminate the subject sufficiently so that the subject's features may be picked up by the camera. However, since such light generally strikes the subject at an angle, and frequently comes from behind the subject, deep shadowing can result in the transmitted picture. Such shadowing may hamper identification in security applications and is unattractive and unpleasant for the users in all applications.

Heretofore, the shadowing problem in such cameras has been dealt with, if at all, by providing a light source mounted on or adjacent to the camera which shines in the subject's face. However, having a light shining in his face is uncomfortable to the user, particularly in applications such as a picturephone where the camera may be in use for an extended period of time. Light shining in his face may also cause the subject to have an unattractive squint.

A need therefore exists for a method and apparatus of illuminating the subject being photographed by a CCD camera or equivalent device so as to eliminate shadowing in the image without resulting in the user being bothered by light shining in his eyes or causing the user to squint.

SUMMARY OF THE INVENTION

This invention overcomes the problem indicated above by providing a method and apparatus for illuminating the subject being photographed by a CCD camera or equivalent device by generating an infrared light and illuminating the subject with the generated infrared light. Such light may be shined in the face of the user and eliminate shadows from the photographed image without the user being aware of the existence of the light and therefore being bothered thereby. For preferred embodiments, the infrared light is generated by infrared light-emitting diodes mounted in or on the camera.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Referring to the figures, a camera 10 is shown which may for example be a CCD camera used in conjunction with a picture telephone or a security system. The camera has a lens 12 which is used to photograph a subject 14 which would typically be a person as shown in the figure. Ambient light for photographing subject 14 may be provided from a source 16 which may be the sun or may be a source of artificial illumination such as an incandescent or fluorescent light. Since source 16 is frequently above or behind subject 14, the face of the subject is frequently not well illuminated, and in particular, is not uniformly illuminated, resulting in deep shadowing in the photographed and transmitted image.

Figure 1:
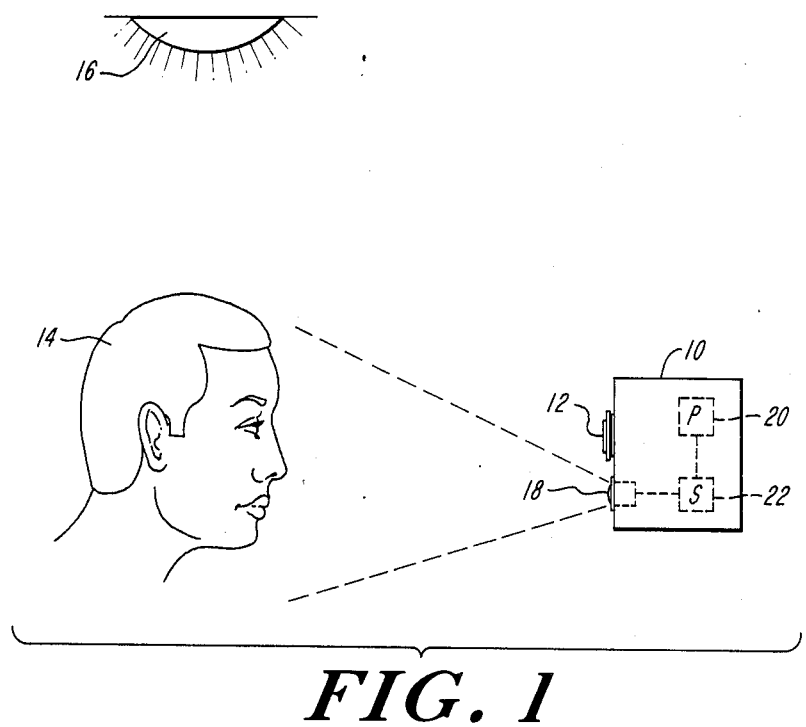
FIG. 1 is a side plane view illustrating a camera incorporating the teachings of this invention being used to illuminate a subject.
Figure 2:
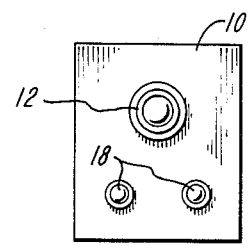
FIG. 2 is a front plane view of the camera shown in FIG. 1.

In accordance with the teachings of this invention, the shadowing problem is overcome by providing a pair of infrared light-emitting diodes 18 mounted in the front of camera 10 under lens 12. The exact number and location of diodes 18 is not critical. However, two diodes mounted on opposite sides of the lens as shown in FIG. 2 normally provides adequate illumination to eliminate any shadowing effects. The diodes may be energized from a power source 20 inside camera 10 through a switch 22. Power source 20 may for example be a source of positive voltage. Switch 22 may be an electronic switch which permits power to be applied to the diodes when camera 10 is turned on.

Since infrared light is not visible to the subject 14, having the infrared light from diodes 18 shine in the subject's face for an extended period of time does not cause the subject any discomfort and does not cause the subject to squint.

A method and apparatus has thus been disclosed which permits proper illumination of a subject being photographed by a CCD or other camera so as to eliminate shadowing without disturbing the user by shining visible light in his eyes.

While for the preferred embodiment described above, the infrared light from diodes 18 has been a secondary light source, by using a suitable number of IR-emitting diodes, such diodes could be the primary or even sole source of illumination in such applications. Further, while infrared light-emitting diodes have been indicated as the source of the infrared light, other suitable infrared light-emitting sources could be utilized for this purpose.

In summary, by use of an infrared light source, light may be shined in the face of the user and thus eliminate shadows from the photographed image without the user actually being aware of the existence of the light and thus without being bothered thereby. Even though the subject being photographed is not bothered by the infrared light, it does provide sufficient illumination in the photographed image to highlight the subject and reduce shadowing.

Thus, while the invention has been shown and described above with reference to a preferred embodiment, the foregoing and other changes in form and detail may be made therein without departing from the spirit and scope of the invention.

What is claimed is:

1. In an image transmitting camera of a type which is responsive to both visible light and infrared light, a method for reducing shadowing of the subject in the transmitted image comprising the steps of:

generating infrared light;

illuminating the subject with the infrared light, such illumination being in addition to any ambient lighting of the subject; and receiving the image at the camera in both the visual light and infrared frequency ranges;

whereby any dificiencies in the illumination of the subject by ambient light may be compensated for and overcome by the infrared illumination.

2. A method as claimed in claim 1 wherein the camera is a CCD camera.

3. A method as claimed in claim 1 wherein the subject is a person; and wherein the infrared light shines in the person's face.

4. In an image transmitting camera of the type which is responsive to both visible light and infrared light, apparatus for reducing shadowing of the subject in the transmitted image comprising:

a source of infrared light;

means for mounting the source of infrared light to illuminate the subject with the infrared light, such illumination being in addition to any ambient lighting of the subject; and means for receiving the image at the camera in both the visual light and infrared frequency ranges;

whereby any deficiencies in the illumination of the subject by ambient light may be compensated for and overcome by the infrared illumination.

5. Apparatus as claimed in claim 4 wherein said source is one or more infrared light emitting diodes.

6. Apparatus as claimed in claim 5 wherein there are two infrared light emitting diodes.

7. Apparatus as claimed in claim 5 wherein the infrared light emitting diodes are mounted in the camera.

8. Apparatus as claimed in claim 4 wherein the source of infrared light is mounted in the camera.

9. Apparatus as claimed in claim 8 including means for turning on the source of infrared light when the camera is turned on.

10. Apparatus as claimed in claim 4 wherein the subject is a person; and wherein said means for mounting mounts said source to illuminate the face of the subject.

* * * * *